United States Patent [19]
Fein et al.

[11] Patent Number: 6,088,711
[45] Date of Patent: Jul. 11, 2000

[54] METHOD AND SYSTEM FOR DEFINING AND APPLYING A STYLE TO A PARAGRAPH

[75] Inventors: Ronald Andrew Fein; Stephen M. Hirsch, both of Seattle; Jason T. Barnett, Renton, all of Wash.

[73] Assignee: Microsoft Corporation, Redmond, Wash.

[21] Appl. No.: 08/886,688

[22] Filed: Jul. 1, 1997

[51] Int. Cl.[7] .................................................. G06F 17/21
[52] U.S. Cl. ........................ 707/523; 707/500; 707/530
[58] Field of Search ................................. 707/517, 529, 707/530, 523, 500

[56] References Cited

U.S. PATENT DOCUMENTS

| | | | |
|---|---|---|---|
| 5,033,008 | 7/1991 | Barker et al. | 707/523 |
| 5,361,204 | 11/1994 | McCollough et al. | 707/530 |
| 5,651,619 | 7/1997 | Nunokawa et al. | 400/83 |
| 5,778,397 | 7/1998 | Kupiec et al. | 707/500 |
| 5,802,533 | 9/1998 | Walker | 707/529 |
| 5,868,504 | 2/1999 | Nunokawa et al. | 400/61 |

OTHER PUBLICATIONS

"Using FrameMaker: Windows and Macintosh Version, FrameMaker 4." San Jose: Frame Technology Corp., 1993) pp. i–1–1, 21–1,2–29, 2–32, 3–2, 4–2 to 4–5, 4–8 to 4–9, 4–11, 4–13 to 4–16, 4–32 to 4–33, 5–6, to 5–16, and 8–7 to 8–12, Sep. 1, 1993.

*Primary Examiner*—James P. Trammell
*Assistant Examiner*—John Leonard Young
*Attorney, Agent, or Firm*—Jones & Askew, LLP

[57] ABSTRACT

A method and system for defining and applying a style of a paragraph based upon the formatting properties of the paragraph. The paragraph type of the paragraph is identified. A determination is made whether the paragraph type is one which is capable of having a style defined for it. If not, then a determination is made whether the major formatting properties of the paragraph match those of an existing style and, if so, then the matching existing style is applied to the paragraph. If the paragraph type is one which is capable of having a style defined for it, then a determination is made whether the major formatting properties of the paragraph match the those of an existing style with the same paragraph type as the paragraph type of the paragraph. If so, then the matching existing style is applied to the paragraph. If not, then a style is defined with the formatting properties of the paragraph. The defined style is then applied to the paragraph and all direct formatting is removed.

17 Claims, 5 Drawing Sheets

METHOD AND SYSTEM FOR DEFINING AND APPLYING A STYLE TO A PARAGRAPH

TECHNICAL FIELD

This invention relates to a system and method for defining a style of a paragraph based upon the formatting of the paragraph. More particularly, this invention relates to a method and system for automatically applying a style to a paragraph in a word processing document, based upon the formatting of the paragraph, after the user has created or edited the paragraph.

BACKGROUND OF THE INVENTION

Most modern word processor program modules, desktop publishing program modules, and other document layout program modules include the feature of styles. A style is a named set of formatting properties. A formatting property defines how the characters or paragraphs that are entered by a user will appear on a monitor or printed page. Examples of formatting properties include bold, italics, font size, font face, underline, and color, among many others.

When a new document is created by a user of a word processing program module, the style for the document is typically called "normal" and the new document includes a set of formatting properties. The user can define the "normal" style with the formatting properties that the user typically desires, so that these formatting properties are automatically applied when the user creates a new document. The user can also define other styles and apply these styles to characters or paragraphs in a document. Defining styles refers to the process of storing formatting properties associated with a named style.

The canonical purpose of a style is to enable a document to be marked with various "logical" formatting elements (headings, body text, etc.) and then allow the actual formatting properties (font size, font face, etc.) to be determined by the definition of the style, which the user can edit, thus propagating the formatting changes throughout the document.

In addition to allowing text to be specified as having a certain style, most document preparation and display systems, including word processing program modules and Web browser program modules, also include separate style sheets which define a set of styles for a particular type of document. For example, a "heading" style in an accounting memo may have different formatting properties than those of a "heading" style in a press release. A document is typically associated with a template and derives its styles from that template. Also, some styles may optionally be stored in the document itself.

The advantages of styles are well-known. Suppose, for example, a user has a document consisting of five parts, with each part containing four chapters. The titles of the parts are marked with the following formatting properties: Arial Black, 24 point, bold, centered, all caps. The chapter titles are marked with the following formatting properties: Arial, 20 point, italics, centered. The body text of the document is marked with the following formatting properties: Times New Roman, 10 point.

Further suppose that the user wishes to change all of the chapter titles to be bold. Using direct formatting, the user would go directly to each of the twenty chapter titles and apply the bold formatting property. Direct formatting refers to the process of adding formatting properties "on top of" a style, rather than defining a new style that includes all the formatting properties desired. The direct formatting process can be tedious and time-consuming. Had the user applied a style to the chapter titles, such as a style called "chapter title", the user could simply redefine the "chapter title" style and all of the chapter titles which get their formatting from the "chapter title" style would reflect the redefined style. Similarly, the user could define styles for the titles of the parts, such as "part title", and could further define a style for the body text, such as "text". For example, the "text" style could include the following formatting properties: Times New Roman and 10 point. The "chapter title" style could include the following formatting properties: Arial, 20 point, italics, centered. The "part title" style could include the following formatting properties: Arial Black, 24 point, bold, centered, all caps.

In addition to the advantages of styles described above, styles may serve as fundamental building blocks for many of the features offered by a typical word processing program module. For instance, styles may be used with a Table of Contents feature. When the Table of Contents feature is selected, a table of contents for a document will automatically be created from the paragraphs in the document defined with the "heading" style. As another example, an Outline View feature may use styles to display a hierarchical tree-structured view of a document organized by style. For instance, the paragraph defined by the "heading 1" style will be displayed at the top of the tree-structured view, the paragraph defined by the "heading 2" style will be displayed next, the paragraph defined by the "heading 3" style will then be displayed, etc.

Usability research indicates that most users do not know about styles, do not know how to define their own styles, or find it difficult to define their own styles. Thus, most users apply direct formatting to the text in their documents, e.g., to make a paragraph larger and bold, most users apply a larger font size formatting property and a bold formatting property to the style that was originally applied when the document was created, such as the "normal" style. As a result of not defining and applying styles to similar elements of text in a document, a user suffers in several ways. First, it is very tedious for the user to change the formatting properties of similar elements in a document. Second, the features that use styles as building blocks do not always work properly if the styles are not defined. For instance, if a user selects the Table of Contents feature, but has not defined any paragraphs with a "heading" style, then there will be nothing in the table of contents.

Therefore, there is a need in the art for a program module that simplifies the process of defining a style for a paragraph that the user enters or edits. There is a further need in the art for a program module that simplifies the process of applying a style. There is still a further need in the art for a program module that defines and applies styles to text in a document without requiring the user to understand or define styles. There is also a need for a program module that automatically defines a style for a paragraph that a user has created, or edited. There is a further need for a program module that defines a style for a paragraph that the user has created, whereby advanced features that depend on styles will function properly.

SUMMARY OF THE INVENTION

The present invention satisfies the above described needs by providing a system and method for defining a style for a paragraph and applying the style to the paragraph. Generally described, the present invention provides a computer-implemented method for defining a style for a paragraph and applying the style to the paragraph.

In one aspect, a paragraph type of the paragraph is identified and, based upon the paragraph type, a determination is made whether there is an appropriate style to define. The paragraph type is a general, functional description of the paragraph. For example, the paragraph type may be a heading or body text. In the preferred application program module, formatting properties are divided into major formatting properties and minor formatting properties. It is then determined whether the appropriate style has already been defined and, if not, then the major formatting properties and the minor formatting properties of the paragraph are stored in association with the appropriate style to define the appropriate style. The defined style may then be applied to the paragraph. All direct formatting may also be removed once the defined style is applied to the paragraph.

In one aspect, the step of identifying the paragraph type is accomplished by analyzing different features of the paragraph to determine the paragraph type. The different features may include features such as the length of the paragraph, capitalization of the paragraph, and punctuation of the paragraph.

In another aspect, the step of identifying the paragraph type of the paragraph begins by determining whether the paragraph is one line in length, and, if not, then identifying the paragraph type as body text. If the paragraph is one line in length, then a determination is made whether the major formatting properties of the paragraph match the major formatting properties of a previously defined body text style. If so, then an inquiry is conducted to determine whether the paragraph ends in one of a predetermined set of punctuation marks. If so, the paragraph type is identified as body text. The predetermined set of punctuation marks may comprise a period, a question mark, an exclamation point, and a colon.

However, if the major formatting properties of the paragraph do not match the major formatting properties of a previously defined body text style, or, if the paragraph does not end in a period, a question mark, an exclamation point, or a colon, then a determination is made whether the paragraph begins with a capital letter. If the paragraph begins with a capital letter, then a determination is made whether the paragraph ends with an exclamation point, question mark, or no punctuation. If so, an inquiry is conducted to determine whether the paragraph is bold, italicized, or underlined. If it is determined that the paragraph is bold, italicized, or underlined, then the paragraph type is identified as a heading. However, if the paragraph is not bold, italicized, or underlined, then a determination is made whether the point size of the paragraph is larger than the point size for a normal style, and, if so, then the paragraph type is identified as a heading.

In yet another aspect, the step of determining the appropriate style to define for the paragraph may include analyzing a number of features of the paragraph to determine one of the specific functional styles. The specific functional style identified by this inquiry is then used as the appropriate style to define. The features may include placement of the paragraph in the document and indentation of the paragraph. Each specific functional style corresponds to a specific function of the paragraph in the document. Examples of specific functional styles include caption style, title style, subtitle style, block text style and heading style, among others.

In still another aspect, the present invention is a system for applying a style to a paragraph. A processor, responsive to instructions from a program module, is operative to identify a paragraph type of the paragraph and to determine whether the paragraph type of the paragraph is capable of having a style defined for it. If not, then the processor is operative to determine whether the formatting properties of the paragraph match the formatting properties of one of a number of previously defined styles. If so, the processor applies the previously defined style that matches the paragraph. Because there are a limited number of styles to define, if a previously defined style closely matches the paragraph, then the matching style is applied to the paragraph rather than defining a new style for the paragraph.

If the processor determines that the paragraph type is capable of having a defined style and further determines that the formatting properties of the paragraph do not match the formatting properties of a previously defined style of the same paragraph type, then a new style is defined. The new style includes all of the formatting properties, minor and major, of the paragraph. The newly defined style may then be applied to the paragraph.

These and other features, advantages, and aspects of the present invention may be more clearly understood and appreciated from a review of the following detailed description of the disclosed embodiments and by reference to the appended drawings and claims.

DETAILED DESCRIPTION

The present invention is directed toward a method and system for defining a style for a paragraph after the user creates or edits a paragraph. In one embodiment, the invention is incorporated into a word processing application program sold under the trademark "WORD 8.0", marketed by Microsoft Corporation of Redmond, Wash. Briefly described, the preferred application program allows a user to create and edit electronic documents by entering characters, symbols, graphical objects, and commands. The preferred application program also allows a user to define styles for text in a document. A style is a named set of formatting properties. After the user has created or edited a paragraph, the paragraph is automatically checked in the background to determine if an existing style should be applied to the paragraph or if a new style should be defined based upon the formatting properties of the paragraph. The user does not have to enter any commands to initiate the style definition or understand how styles function. If an existing style is found that closely resembles the formatting properties of the paragraph, then the existing style is applied to the paragraph. If no existing style is found that closely resembles the formatting properties of the paragraph, then a new style may be defined with the formatting properties of the paragraph. This newly defined style may be applied to the paragraph.

Exemplary Operating Environment

Referring now to the drawings, in which like numerals represent like elements throughout the several figures, aspects of the present invention and the exemplary operating environment will be described.

Figure 1:
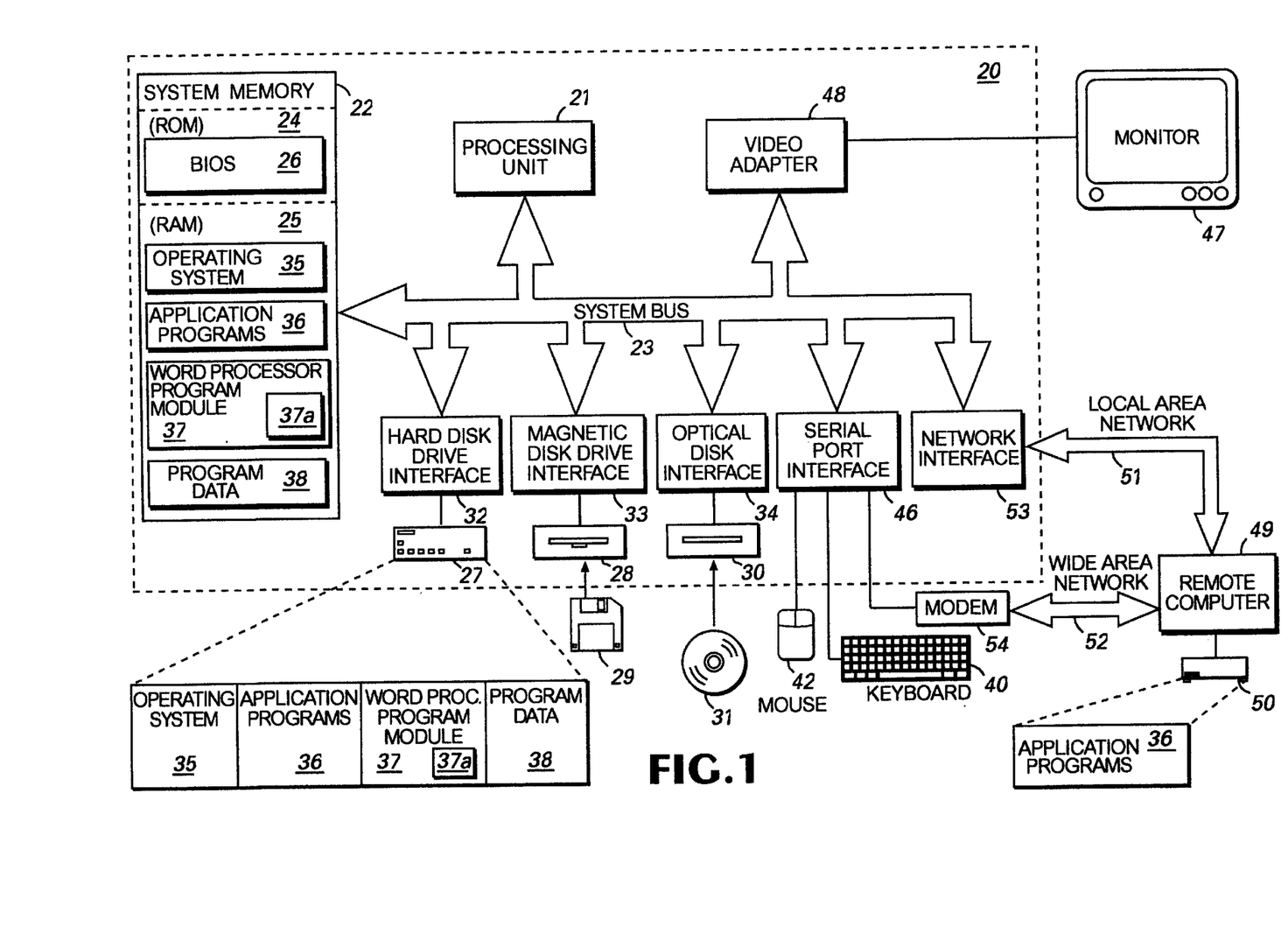
FIG. 1 is a block diagram of a computer that provides the operating environment for the preferred embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37, program data 38, and other program modules (not shown). The word processor program module 37 may also include a style program module 37a for defining a style for a paragraph. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Defining and Applying a Style to a Paragraph

Briefly described, the present invention provides a method and system for automatically applying a style to a paragraph in a document. An existing style may be applied to the paragraph. A new style may also be defined and applied to the paragraph if the paragraph does not match an existing style.

Figure 2A:
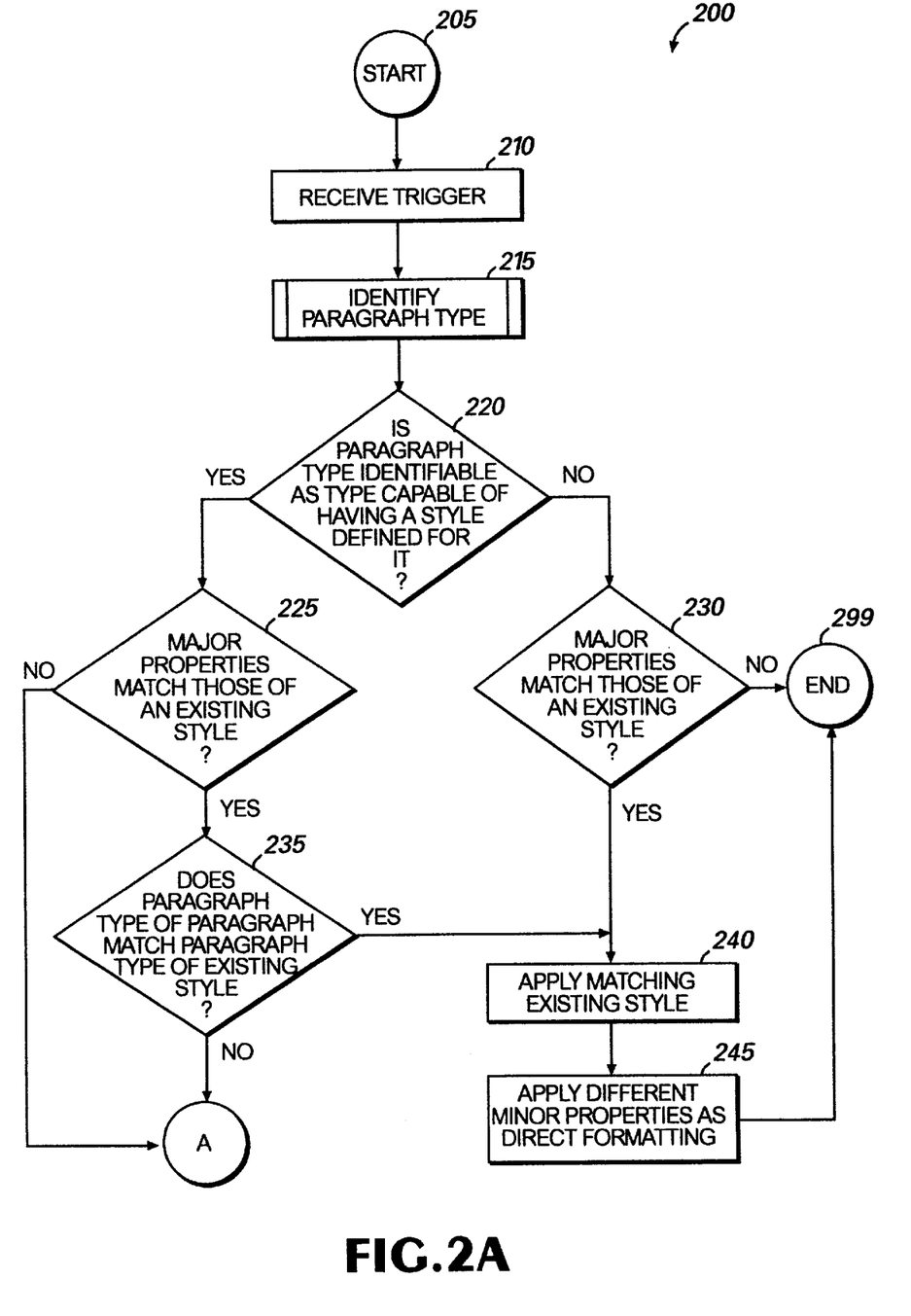
FIGS. 2A–2B, collectively described as FIG. 2, are flow charts illustrating an embodiment of the present invention for a method for automatically defining and applying a style to a paragraph.
Figure 2B:
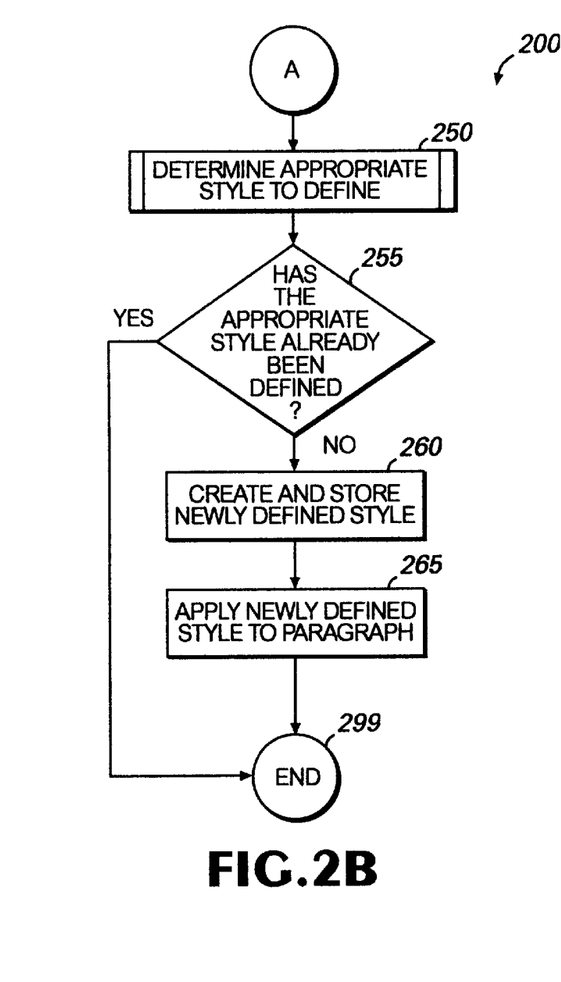

FIGS. 2A–2B are flow charts illustrating a method 200 for automatically defining and applying a style to a paragraph that has been created or edited by a user in accordance with an exemplary embodiment of the present invention. Those skilled in the art will appreciate that this exemplary embodiment is a computer-implemented process that is carried out by the computer in response to input from the user and instructions provided by the preferred application program module.

Referring now to FIG. 2A, the method 200 begins at start step 205 and proceeds to step 210 when a trigger is received by the preferred application program module. The trigger is an indication to the preferred application program module to begin the method 200. Preferably, the trigger is generated when the user has created a paragraph, and then exited the paragraph. Examples of exiting a paragraph include, but are not limited to, entering a carriage return, pressing the return key on keyboard 40, or moving a cursor outside of the paragraph. The trigger may also be generated when the user edits the formatting properties of an existing paragraph and then exits the paragraph. It should be understood that a paragraph, as described herein, may be as short as one line in length.

The trigger at step 210 is preferably generated by an event monitor that monitors user events. The event monitor is described in detail in commonly assigned U.S. patent application Ser. No. 08/657,645 for "A System for Selectively Recording and Viewing a Data Structure Associated with an Action by a Program Module" filed May 30, 1996, which is incorporated by reference herein.

After the trigger is received by the preferred application program module at step 210, a paragraph type of the created or edited paragraph is identified at step 215. Hereinafter, the created or edited paragraph will simply be referred to as the paragraph. The paragraph type of a paragraph is a generalization of the hypothesized function of the paragraph in the document, which is preferably determined by examining the paragraph for certain traits and features. For example, paragraph types may include body text and headings. Body text generally includes certain traits and features that headings do not, and vice versa. The preferred method for determining the paragraph type of the paragraph will be described in detail below with reference to FIGS. 3A–3B.

At decision step 220, a determination is made whether the paragraph type identified at step 215 is a paragraph type that is capable of having a style defined for it. The preferred application program module includes a limited number of styles that can be defined. Preferably, the styles capable of being defined are allocated to different paragraph types. Because there are a limited number of styles that can be defined, some paragraph types may have no styles for definition allocated to them. For example, suppose a paragraph type is identified as a "list" at step 215 and further suppose that, in the preferred application program module, there are no styles for definition allocated to "lists". Then, for this example, at step 220, it is determined that the paragraph type, i.e., "list", is not one that is capable of having a style defined for it. Of course, if no paragraph type is identified at step 215, then, at decision step 220, it will also be determined that the paragraph type is not one that is capable of having a defined style.

If, at decision step 220, it is determined that the paragraph type is one which is capable of having a style defined for it, then the method proceeds to decision step 225. However, if, at decision step 220, it is determined that the paragraph type is not one which is capable of having a defined style, then the method proceeds to decision step 230. As described above, it should be noted that the paragraph type of some paragraphs may not be identifiable at step 215. For these paragraphs, it is not possible to define a style, so the method proceeds to step 230. It should further be noted that even though the paragraph type of a paragraph may not be identifiable and, thus, a style can not be defined for this paragraph, it is still possible that an existing style may be applied to the paragraph.

At decision step 225, a determination is made whether all of the major formatting properties of the paragraph match all of the major formatting properties of an existing style, i.e., a style which has been defined previously for the document. An existing style is a style which was automatically defined through a method in accordance with the present invention or a style which was defined by the user using prior known methods. An existing style may also be part of a template or built into the application program module.

In the preferred application program module, formatting properties are divided between major formatting properties and minor formatting properties. Table 1 illustrates the major formatting properties in the preferred application program module. Any formatting property that is not a major formatting property, as shown in Table 1, is a minor formatting property in the preferred application program module. Those skilled in the art will recognize that, in alternative embodiments, the major formatting properties may be different than those described in Table 1 without departing from the spirit and scope of the present invention.

TABLE 1

Major Formatting Properties

Bold, Italic, Underline, Point Size, Color, Left Indentation, Right Indentation, Alignment, Border (location), Border Style, Shading, Bullet Character, Number Scheme, and a property that indicates the paragraph is in a frame Table 2 illustrates some of the minor formatting properties in the preferred application program module. Those skilled in the art will recognize that, in alternative embodiments, the minor formatting properties may be different than those described in Table 2 without departing from the spirit and scope of the present invention.

TABLE 2

Minor Formatting Properties

Space Before, Space After, Strikethrough, Kerning, Animated Text, Widow/Orphan Control, Character Scaling, Line Spacing, Pagebreak Before Still referring to FIG. 2A, if, at decision step 225, it is determined that all of the major formatting properties of the paragraph match all of the major formatting properties of an existing style, then the method proceeds to decision step 235. However, if, at decision step 225, it is determined that all of the major formatting properties do not match all of the major formatting properties of an existing style, then the method proceeds to node A. Node A is simply a connecting point between the portion of the flow chart illustrated in FIG. 2A and the portion of the flow chart illustrated in FIG. 2B.

At decision step 235, an inquiry is conducted to determine whether the paragraph type of the paragraph matches the paragraph type associated with the existing style that was found at decision step 225. For example, if the paragraph type of the paragraph is "body text" and the paragraph type of the existing style is "body text", then the paragraph type of the paragraph matches the paragraph type associated with the existing style. As another example, suppose the paragraph type of the paragraph is "body text" and the paragraph type of the existing style is "heading". For this case, the paragraph type of the paragraph does not match the paragraph type associated with the existing style at decision step 235.

If, at decision step 235, the paragraph type of the paragraph matches the paragraph type associated with the existing style, then the method proceeds to step 240. However, if the paragraph type of the paragraph does not match the paragraph type associated with the existing style, then the method proceeds to node A.

Still referring to FIG. 2A, if, at decision step 220, it is determined that the paragraph type is not one which is capable of having a style defined for it, then the method proceeds to decision step 230. At decision step 230, a determination is made whether all of the major formatting properties of the paragraph match all of the major formatting properties of an existing style.

If, at decision step 230, it is determined that all of the major formatting properties of the paragraph match all of the major formatting properties of an existing style, then the method proceeds to step 240. However, if, at decision step 230, it is determined that all of the major formatting properties do not match all of the major formatting properties of an existing style, then the method ends at step 299.

Still referring to FIG. 2A, at step 240, the matching existing style that was found at step 225, or alternatively at step 230, is applied to the paragraph. In other words, at step 240, the direct formatting for the formatting properties of the paragraph is removed and the formatting properties of the matching existing style are applied to the paragraph. The method then proceeds to step 245.

At step 245, the minor formatting properties of the paragraph that were different than the minor formatting properties of the matching existing style, if any, are applied as direct formatting to the matching existing style. For example, suppose the paragraph includes 24 point bold Palatino with 10% kerning as direct formatting and further suppose that the matching existing style is 24 point bold Palatino. Then, at step 245, the 10% kerning, a minor formatting property, would be applied to the style as direct formatting. The method then ends at step 299.

Returning to decision step 225, if it is not true that all of the major properties match all of the major properties of an existing style, then the method proceeds to node A. The method also proceeds to node A if, at decision step 235, it is determined that the paragraph type of the paragraph does not match the paragraph type of the existing style. The steps of method 200 performed in connection with node A will be described below in reference to FIG. 2B.

Referring now to FIG. 2B, method 200 proceeds from node A to step 250 where the appropriate style to define for the paragraph is determined. In the preferred application program module, there are a limited number of styles that can be defined. These styles are allocated based upon the paragraph type associated with the style. For example, for the preferred application program module, there are two paragraph types, known as heading and body text. In the preferred application program module, there are twelve styles that can be defined for the heading paragraph type. These styles are headings 1–9, caption, title, and subtitle. In the preferred application program module, there are seven styles that can be defined for the body text paragraph type. These styles are body text 1–3, body text indent 1–3, and block text. At step 250, the appropriate one of the above-described styles to define for the paragraph is determined. This determination is based upon the likely function of the paragraph in the document. For example, if it is likely, based upon certain predetermined rules, that the paragraph is a caption, then the appropriate style to define will be determined to be a caption at step 250. The preferred method for determining the appropriate style to define will be described in detail below in connection with FIG. 4.

After the appropriate style to define for the paragraph is determined at step 250, the method proceeds to decision step 255. It is determined, at decision step 255, whether the appropriate style, as determined at step 250, has previously been defined. It should be understood that the purpose of step 255 is to determine whether the particular style or styles are already defined, because, if so, then there is not a new style to define and the method ends. For example, if, at step 250, it is determined that the appropriate style to define is a caption, but the caption style has already been defined, then it is determined that the appropriate style has already been defined at step 255.

If, at decision step 255, it is determined that the appropriate style has not already been defined, then the method proceeds to step 260. However, if, at decision step 255, it is determined that the appropriate style has already been defined, then no new style is defined for the paragraph and the method ends at step 299.

At step 260, the appropriate style is created and stored with the major formatting properties and minor formatting properties of the paragraph. It should be understood that the style created at step 260 becomes an existing style that can be applied to paragraphs that are subsequently created or edited. After the new style is created and stored, the method proceeds to step 265.

At step 265, the defined style that was defined at step 260 is applied to the paragraph. All direct formatting, including minor and major formatting properties, is removed from the paragraph. After the defined style is applied to the paragraph at step 265, then the method ends at step 299.

It should be understood that the style created at step 260 was created using both the major and minor formatting properties of the paragraph. Thus, because the formatting properties of the paragraph and the defined style are identical, the direct formatting of the paragraph can be removed once the defined style is applied to the paragraph at step 265. It will be further understood that, once the defined style is applied to the paragraph, the appearance of the paragraph on the monitor and on the printed page will remain the same as it was when the paragraph was defined using direct formatting.

Figure 3A:
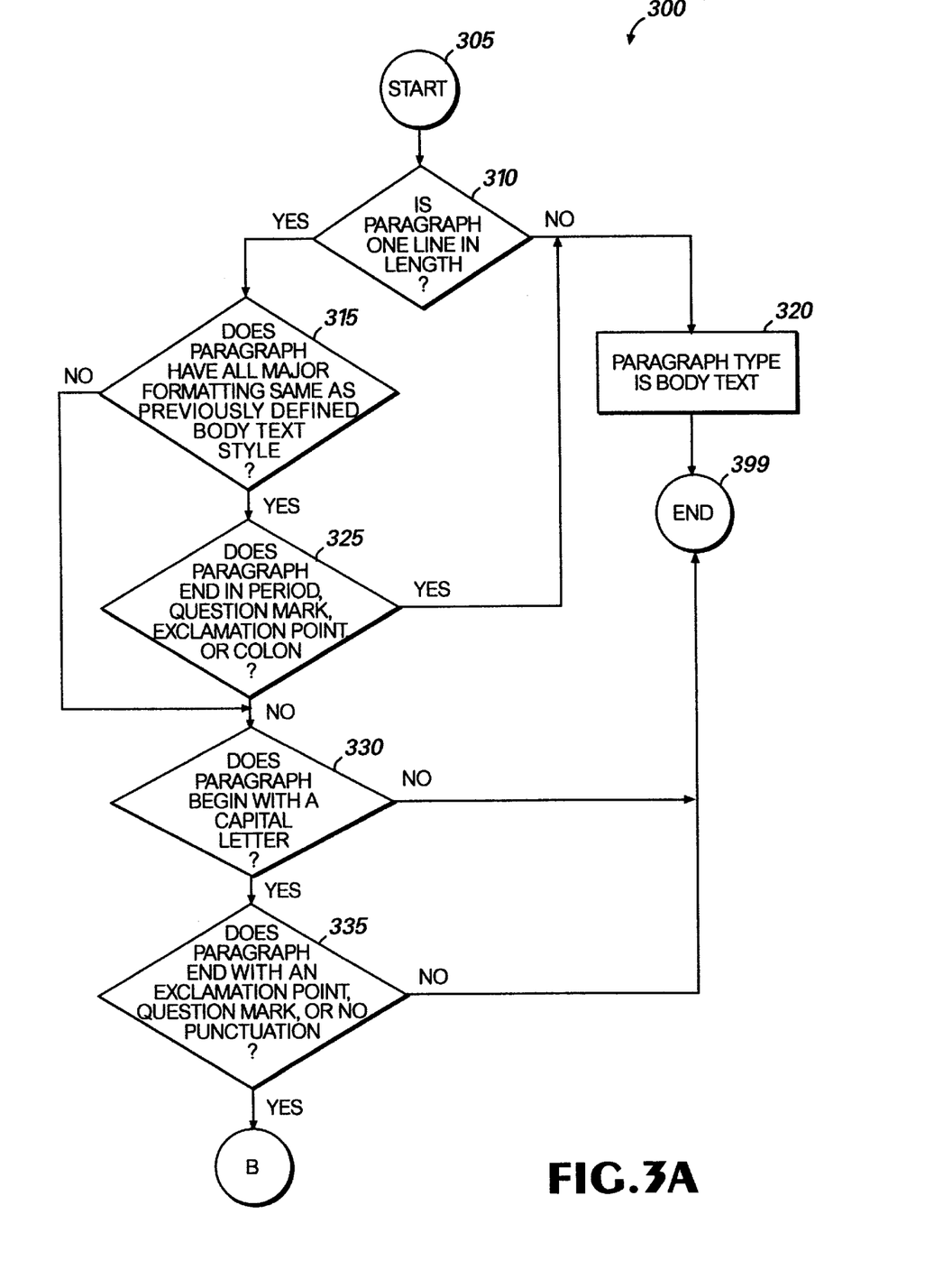
FIGS. 3A–3B, collectively described as FIG. 3, are flow-charts illustrating the preferred method for identifying a paragraph type.
Figure 3B:
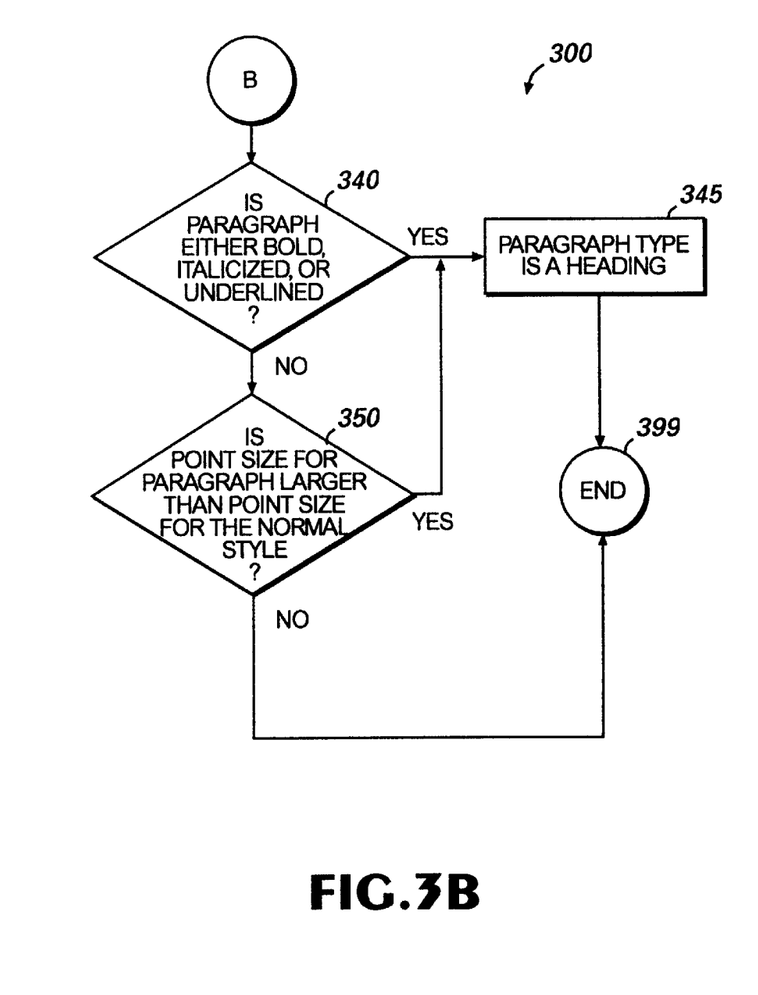

Referring now to FIGS. 3A–3B, a flowchart illustrating the preferred method 300 for performing step 215 for identifying a paragraph type will be described. At step 305, the method 300 begins and proceeds to decision step 310 where it is determined whether the paragraph is one line in length. If so, then the method proceeds to decision step 315. However, if the paragraph is not one line in length, i.e., the paragraph is greater than one line in length, then the paragraph type of the paragraph is determined to be body text as shown at step 320. After it is determined that the paragraph type is body text at step 320, then the method ends at step 399.

Returning to decision step 310, if the paragraph is one line in length, then the method proceeds to decision step 315. At decision step 315, it is determined whether the major formatting properties of the paragraph match all of the major formatting properties of a previously defined body text style. If so, then the method proceeds to decision step 325. If not, then the method proceeds to decision step 330. As described above, the preferred application program module includes body text styles, such as body text 1–3, body text indent 1–3, and block text. Preferably, these are the body text styles that are examined at decision step 315 to determined whether the major formatting properties of the paragraph match the major formatting properties of a previously defined body text style.

At decision step 325, it is determined whether the paragraph ends in a period, a question mark, an exclamation point, or a colon. If it is determined at step 325 that the paragraph ends in either a period, a question mark, an exclamation point, or a colon, then it is determined that the paragraph type is body text as shown at step 320 and the method ends at step 399.

However, if, at decision step 325, it is determined that the paragraph does not end in either a period, a question mark, an exclamation point, or a colon, then the method proceeds to decision step 330.

At decision step 330, it is determined whether the paragraph begins with a capital letter. If not, then no paragraph type is able to be identified and the method ends at step 399. However, if it is determined that the paragraph begins with a capital letter, then the method proceeds to decision step 335.

At decision step 335, it is determined whether the paragraph ends with either an exclamation point, question mark, or without any punctuation. If the paragraph has punctuation at the end and does not end with an exclamation point or question mark, then no paragraph type is able to be identified and the method ends at step 399. However, if it is determined at decision step 335 that the paragraph ends with either an exclamation point, question mark, or no punctuation, then the method proceeds to node B. Node B is a connecting point between the portion of the flow chart illustrated in FIG. 3A and the portion of the flow chart illustrated in FIG. 3B.

Referring now to FIG. 3B, node B is connected to decision step 340. It is determined, at decision step 340, whether the paragraph is one of a predetermined set of text characteristics. The predetermined set of text characteristics may comprise bold, italicized, or underlined. If the paragraph is either bold, italicized, or underlined, then the paragraph type is determined to be a heading at step 345 and the method ends at step 399. However, if at step 340, it is determined that the paragraph is not either bold, italicized, or underlined, then the method proceeds to decision step 350.

At decision step 350, it is determined whether the point size of the paragraph is larger than the point size for the normal style. The normal style is the style that is typically applied when a document is first created. If the point size of the paragraph is larger than the point size for the normal style, then the paragraph type is determined to be a heading at step 345, and the method ends at step 399. However, if, at decision step 350, it is determined that the point size for the paragraph is not larger than the point size for the normal style, then no paragraph type is able to be identified and the method ends at step 399.

Figure 4:
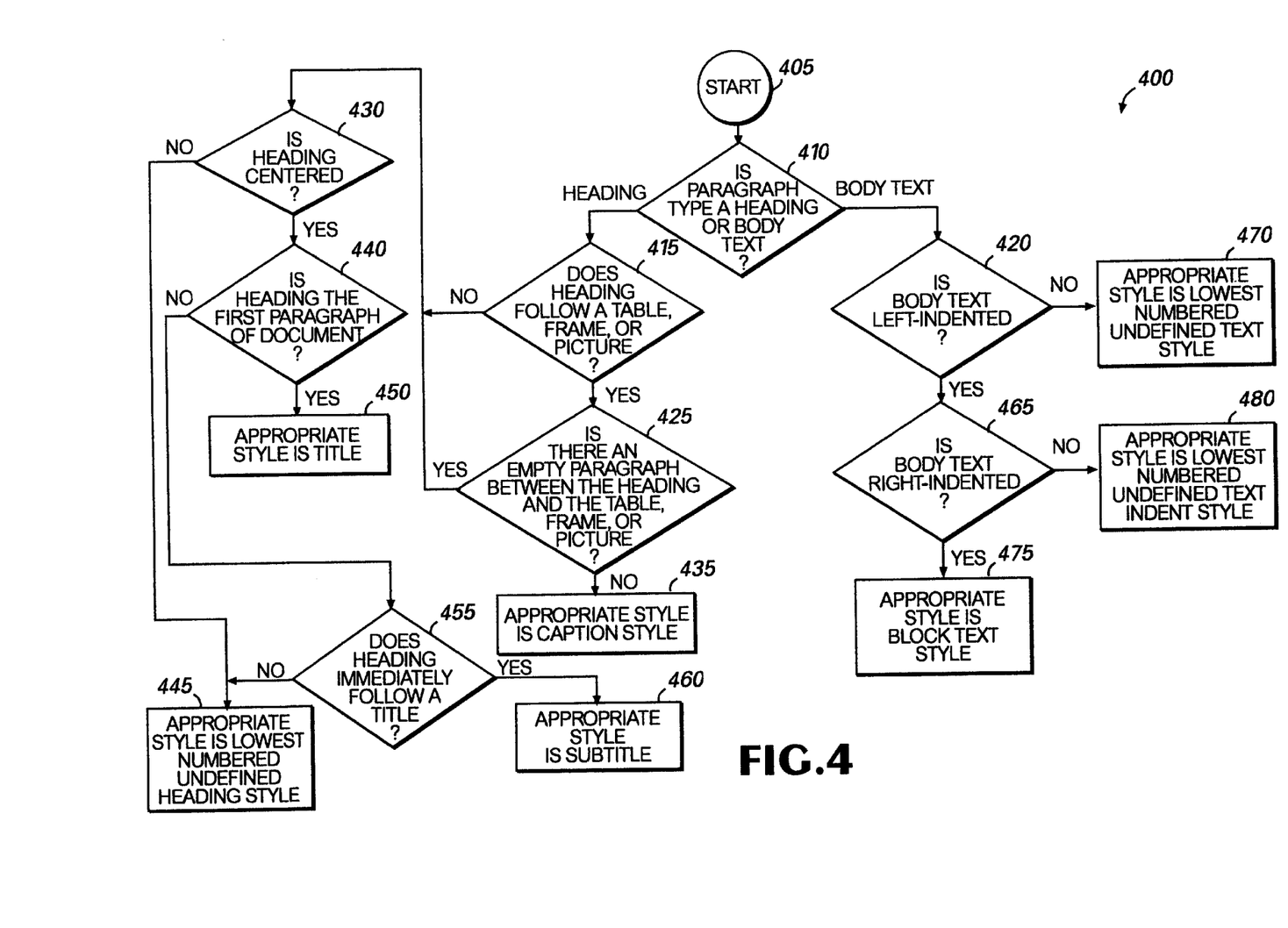
FIG. 4 is a flowchart illustrating the preferred method for determining the appropriate style to define.

Referring now to FIG. 4, a flowchart illustrating the preferred method 400 for determining the appropriate style to define at step 250 will be described. At step 405, the method begins and proceeds to decision step 410 where it is determined whether the paragraph type of the paragraph is a heading or is body text. Of course, this can be determined using the method 300 described in conjunction with FIGS. 3A–3B, or another similar method. If the paragraph type is a heading, then the method proceeds to decision step 415. However, if the paragraph type is body text, then the method proceeds to decision step 420.

At decision step 415, it is determined whether the heading follows either a table, a frame, or a picture in the document. If the heading follows a table, a frame, or a picture, then the method proceeds to decision step 425. However, if the heading does not follow a table, a frame, or a picture, then the method proceeds to decision step 430.

At decision step 425, it is determined whether there is an empty paragraph between the heading and the table, frame, or picture. If there is an empty paragraph between the heading and the table, frame, or picture, then the method proceeds to decision step 430. However, if at decision step 425, it is determined that there is not an empty paragraph between the heading and the table, frame, or picture, then the method proceeds to step 435. At step 435, it is determined that the appropriate style to be defined for the heading is the caption style.

Referring now to decision step 430, it is determined whether the heading is centered. If the heading is centered, then the method proceeds to decision step 440. However, if it is determined that the heading is not centered, then the method proceeds to step 445. At step 445, it is determined that the appropriate style to be defined for the heading is the lowest numbered undefined heading style. As described above, in the preferred application program module, there are nine heading styles that can be defined, i.e., heading 1, heading 2, heading 3, heading 4, heading 5, heading 6, heading 7, heading 8, and heading 9. At step 445, the lowest numbered undefined heading style is determined to be the appropriate style to define. Thus, for example, if heading 1 and heading 2 are the only two heading styles defined, then, at step 445, it is determined that the appropriate heading style to define is heading 3. However, if all of the heading styles are defined, then there is no appropriate heading style to define.

Referring now to decision step 440, it is determined whether the heading is the first paragraph of the document. If the heading is the first paragraph of the document, then the method proceeds to step 450. At step 450, it is determined that the appropriate style to be defined for the heading is the title style.

If, at decision step 440, it is determined that the heading is not the first paragraph in the document, then the method proceeds to decision step 455. At decision step 455, it is determined whether the heading immediately follows a title. Preferably, immediately following a title means that there are no spaces between the heading and the title. If, at decision step 455, it is determined that the heading immediately follows a title, then the method proceeds to step 460. At step 460, it is determined that the appropriate style to be defined for the heading is the subtitle style.

However, if, at decision step 455, it is determined that the heading does not immediately follow a title, then the method proceeds to step 445 where it is determined that the appropriate style to be defined for the heading is the lowest numbered undefined heading style, as described above.

Returning to decision step 410, if the paragraph type is determined to be body text, then the method proceeds to decision step 420. It is determined whether the body text is left-indented at decision step 420. If the body text is determined to be left-indented, then the method proceeds to decision step 465. However, if, at decision step 420, the body text is determined not to be left-indented, then the appropriate style to define is determined to be the next highest numbered undefined text style at step 470. As described above, in the preferred application program module, there are three text styles that can be defined, i.e., text 1, text 2, and text 3.

Referring now to decision step 465, it is determined whether the body text is right-indented. If so, then the appropriate style to define is determined to be the block text style at step 475. However, if, at decision step 465, it is determined that the body text is not right-indented, then the appropriate style is determined to be the lowest numbered undefined text indent style at step 480. As described above, in the preferred application program module, there are three text indent styles that can be defined, i.e., text indent 1, text indent 2, and text indent 3.

It should be understood that the method 400 ends after an appropriate style to define is found at either step 435, step 445, step 450, step 460, step 470, step 475, or step 480.

From the foregoing description, it will be apparent to those skilled in the art that the present invention provides a simplified method and system for defining a style for a paragraph that the user enters or edits. The present invention further provides a method and system for applying a style to a paragraph that the user creates or edits. The present invention still further provides a method and system for defining and applying styles to text in a document that does not require the user to understand or define styles. In fact, the user does not have to perform any steps, the styles are defined and applied automatically in the background after the user creates or edits a paragraph. The present invention still further provides a method and system for applying and defining a style for a paragraph whereby advanced features that depend on styles will function properly. Because styles are automatically defined and applied, advanced features will work properly without requiring the user to be aware of styles or requiring the user to be aware of how to define or apply styles.

It should also be noted that, although the preferred embodiment of the present invention includes the concept of major formatting properties and minor formatting properties, all of the formatting properties of a program module could be considered to be major formatting properties. However, using the concept of major formatting properties, more matching existing styles are found and, thus, fewer styles are defined. Having fewer styles defined is important because the preferred application program module contains a limited number of styles that can be defined. However, if this limited number of styles is not an issue, then all of the formatting properties could be considered major formatting properties and a matching existing style would be one in which all of the formatting properties match all of those of the style.

It should also be noted that a "match", as described herein in relation to major formatting properties, connotes that all of the major formatting properties of the paragraph are included in the matching style and that all of the major formatting properties of the matching style are included in the paragraph. In other words, there is a one-to-one correspondence between the major formatting properties.

It should also be noted that the appended claims should not be limited by the use of the term paragraph in the description above. A paragraph may be any length, may include text, figures, tables, etc., and may even be an empty paragraph, i.e., a blank line. Consequently, the present invention is not limited to operation upon conventional paragraphs, but can be extended to any number of characters, tables, figures, etc.

Although the present invention has been described above as implemented in the preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. For an electronic system for creating and editing an electronic document, the document comprising a paragraph associated with at least one formatting property, a method for defining a style for the paragraph, the method comprising the steps of:

automatically identifying a paragraph type of the paragraph by examining the at least one formatting property; and automatically internally tagging the paragraph as the identified paragraph type.

2. The method recited in claim 1, further comprising the step of determining an appropriate style to define for the paragraph based upon the identified paragraph type.

3. The method recited in claim 2, further comprising the step of determining whether the appropriate style has already been defined and, if not, then storing the at least one formatting property in association with the appropriate style, wherein the appropriate style defines the style for the paragraph.

4. For an electronic system for creating and editing an electronic document, the document comprising a paragraph associated with at least one major formatting property and at least one minor formatting property, a method for defining a style for the paragraph, the method comprising the steps of:

automatically identifying a paragraph type of the paragraph by examining the at least one major formatting property;

determining an appropriate style to define for the paragraph based upon the paragraph type;

determining whether the appropriate style has already been defined; and if not, then storing the at least one major formatting property and the at least one minor formatting property in association with the appropriate style, wherein the appropriate style defines the style for the paragraph.

5. The method recited in claim 4, further comprising the step of applying the appropriate style to the paragraph.

6. The method recited in claim 5, further comprising the step of removing at least one direct formatting property.

7. The method recited in claim 4, wherein the step of identifying the paragraph type of the paragraph comprises analyzing a plurality of features of the paragraph to determine the paragraph type, wherein the paragraph type is a general, functional description of the paragraph.

8. The method recited in claim 7, wherein the paragraph type can be identified as one of either heading or body text.

9. The method recited in claim 7, wherein the plurality of features comprises the length of the paragraph, capitalization of the paragraph, and punctuation of the paragraph.

10. The method recited in claim 4, wherein the step of identifying the paragraph type of the paragraph comprises the steps of:

determining whether the paragraph is one line in length and, if not, then identifying the paragraph type as body text;

if the paragraph is one line in length, then determining whether at least one major formatting property matches a plurality of major formatting properties of a previously defined body text style and, if so, then determining whether the paragraph ends in one of a predetermined set of punctuation marks and, if so, then identifying the paragraph type as body text;

if the at least one major formatting property does not match the plurality of major formatting properties of a previously defined body text style, or if the paragraph does not end in a period, a question mark, an exclamation point, or a colon, then determining whether the paragraph begins with a capital letter;

if the paragraph begins with a capital letter, then determining whether the paragraph ends with an exclamation point, question mark, or no punctuation and, if so, then determining whether the paragraph is one of a predetermined set of text characteristics and, if so, then identifying the paragraph type as a heading; and if the paragraph is not bold, italicized, or underlined, then determining whether the point size of the paragraph is larger than the point size for a normal style, and, if so, then identifying the paragraph type as a heading.

11. A computer-readable medium having computer-executable instructions for performing the steps recited in claim 10.

12. The method recited in claim 4, wherein the step of determining the appropriate style to define for the paragraph comprises the step of analyzing a plurality of features of the paragraph to determine one of a plurality of specific functional styles, wherein the one of the plurality of specific functional styles corresponds to a specific function of the paragraph in the document, and wherein the one of the plurality of specific functional styles comprises the appropriate style.

13. The method recited in claim 12, wherein the plurality of features includes placement of the paragraph in the document and indentation of the paragraph.

14. The method recited in claim 10, wherein the predetermined set of punctuation marks comprises a period, a question mark, an exclamation point and a colon.

15. The method recited in claim 10, wherein the predetermined set of text characteristics comprises bold, italicized, and underlined.

16. For an electronic system for creating and editing an electronic document, the document comprising a paragraph, associated with at least one formatting property, a method for applying a style to the paragraph, the method comprising the steps of:

automatically identifying a paragraph type of the paragraph by examining the at least one formatting property;

determining whether the paragraph type of the paragraph is capable of having a style defined and, if not, then determining whether the at least one formatting property matches a plurality of formatting properties of a previously defined style and, if so, then applying the previously defined style to the paragraph;

if the paragraph type is capable of having a style defined, then determining whether the at least one formatting property matches the plurality of formatting properties of a previously defined style, wherein a paragraph type of the previously defined style matches the paragraph type of the paragraph and, if so, then applying the previously defined style to the paragraph;

if at least one formatting property does not match the plurality of formatting properties of a previously defined style, wherein the paragraph type of the previously defined style matches the paragraph type of the paragraph, then defining a style; and applying the style to the paragraph.

17. A computer system for applying a style to a paragraph, comprising:

a processor; and a memory storage device for storing a program module;

the processor, responsive to instructions from the program module, being operative to;

automatically determine whether a style can be defined for the paragraph;

if not, then automatically determine whether one of a plurality of existing styles contains a plurality of formatting properties that match a plurality of formatting properties of the paragraph, and, if so, then apply the matching existing style to the paragraph;

if a style can be defined for the paragraph, then automatically determine whether one of a plurality of existing styles contains a plurality of formatting properties that match the plurality of formatting properties of the paragraph, and, if so, then apply the matching existing style to the paragraph; and if a style can be defined for the paragraph and it is determined there is not a matching existing style, then automatically define a style for the paragraph and automatically apply the defined style to the paragraph.

* * * * *